US005774566A

United States Patent [19]

Huber et al.

[11] Patent Number: 5,774,566

[45] Date of Patent: Jun. 30, 1998

[54] DEVICE FOR TREATING SIGNALS

[75] Inventors: Robert Huber, Unterengstringen; Peter Fisch, Renens, both of Switzerland

[73] Assignee: Studer Professional Audio AG, Regensdorf, Switzerland

[21] Appl. No.: 570,489

[22] Filed: Dec. 11, 1995

[30] Foreign Application Priority Data

Dec. 15, 1994 [CH] Switzerland ............................ 3801/94

[51] Int. Cl.[6] ........................................................ H04B 1/00

[52] U.S. Cl. ............................ 381/119; 381/118; 84/625; 84/660; 84/697; 345/127

[58] Field of Search .................................... 381/119, 118; 84/625, 660, 697; 345/35, 38–39, 127, 131, 133, 140

[56] References Cited

U.S. PATENT DOCUMENTS

| | | | |
|---|---|---|---|
| 5,212,733 | 5/1993 | DeVitt et al. | 381/119 |
| 5,262,865 | 11/1993 | Herz | 358/181 |
| 5,402,501 | 3/1995 | Silfvajt et al. | 381/119 |
| 5,524,060 | 6/1996 | Silfvast et al. | 381/119 |

FOREIGN PATENT DOCUMENTS

| | | |
|---|---|---|
| 2589664 | 5/1987 | France . |
| 3209312 | 9/1983 | Germany . |
| 8802958 | 4/1988 | WIPO . |
| 9113497 | 9/1991 | WIPO . |

*Primary Examiner*—Curtis Kuntz
*Assistant Examiner*—Duc Nguyen
*Attorney, Agent, or Firm*—Greenblum & Bernstein P.L.C.

[57] ABSTRACT

Device for treating signals. A device for treating signals having multiple inputs for the reception of signals, including adjustable elements for the treatment of signals, wherein the adjustable elements are connected with control elements for control purposes, with the control elements being provided on a control surface, wherein, in order to provide better overview of the control surface, the control surface includes, for the treatment of signals, an image display for each adjustable element for the actual adjustment thereof, with the control surface including additional control elements and additional displays which can be selectively associated with one of the adjustable elements, with the device including connections between each adjustable element, the additional control elements and the additional displays.

13 Claims, 5 Drawing Sheets

FIG. 2a
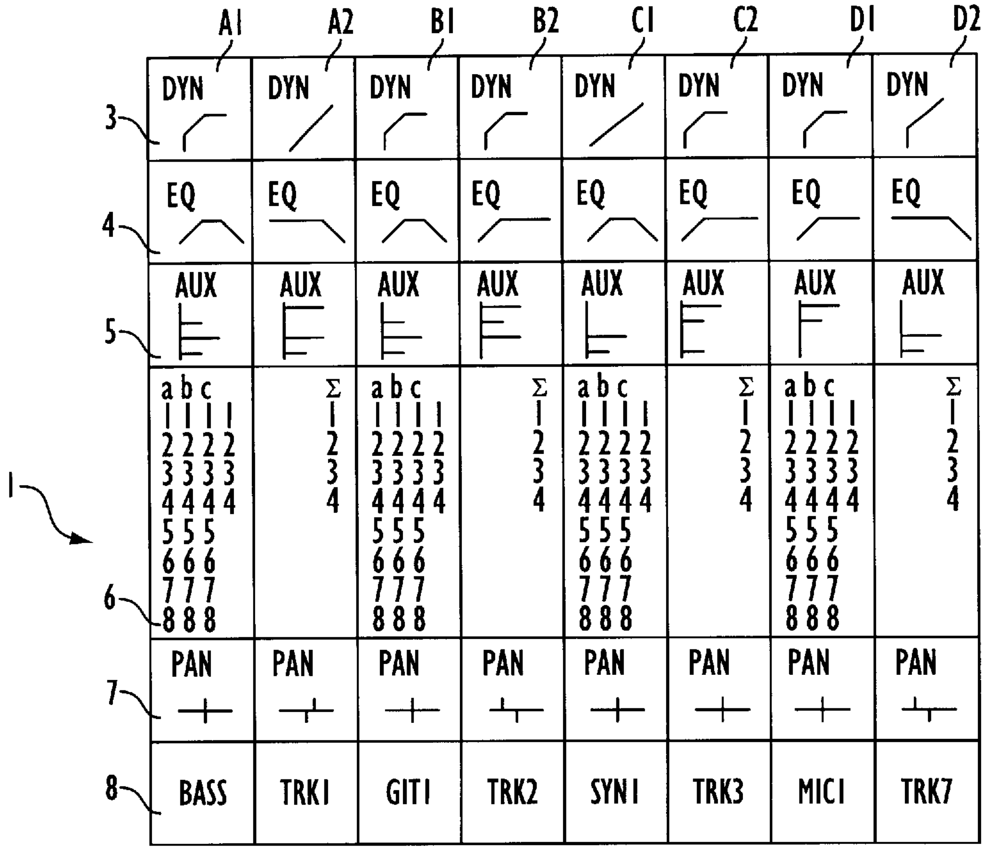
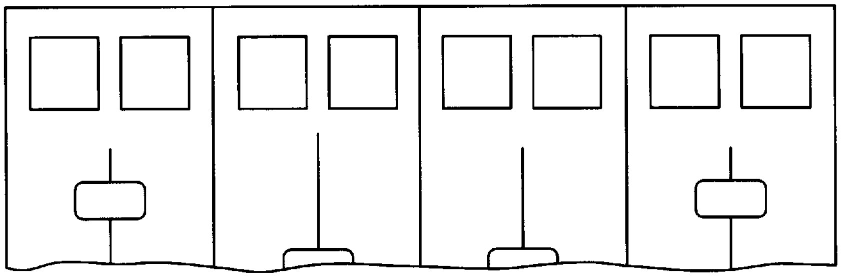
FIG. 2b

FIG. 3a
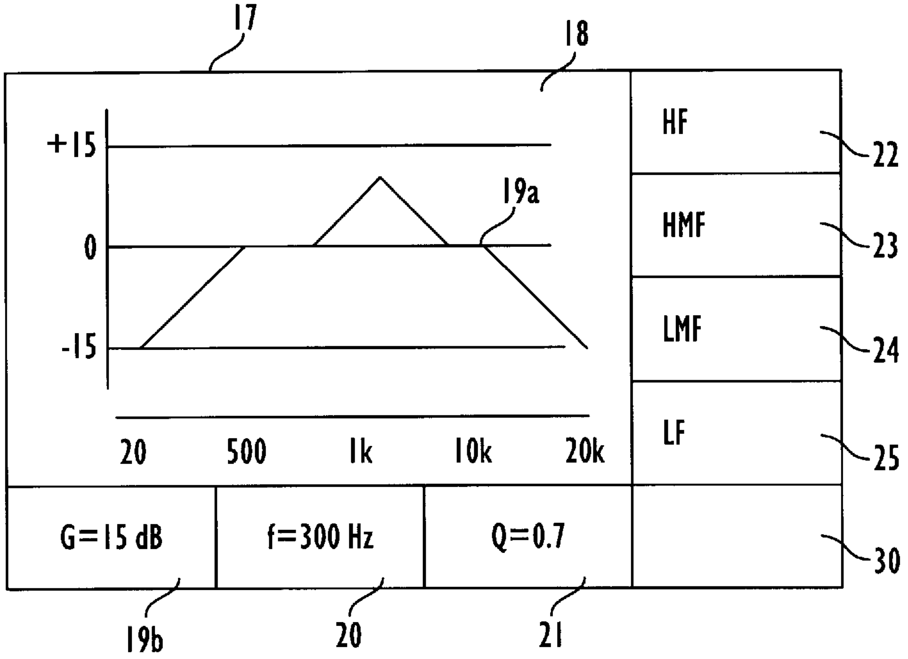
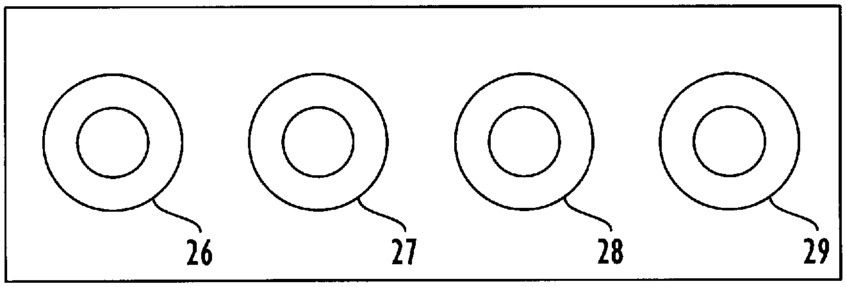
FIG. 3b

FIG. 4a
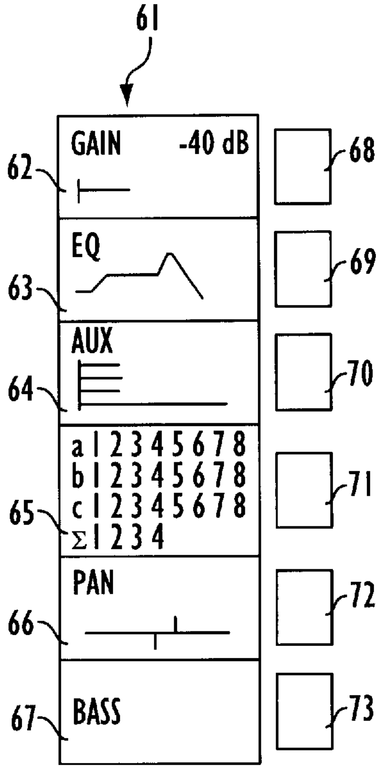
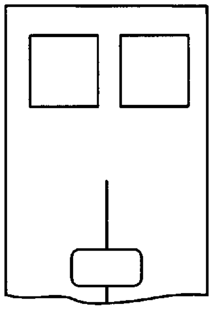
FIG. 4b

DEVICE FOR TREATING SIGNALS

CROSS REFERENCE TO RELATED APPLICATIONS

This application claims the priority of Swiss Application No. CH 3801/94-7, filed Dec. 15, 1994, the disclosure of which is incorporated herein by reference in its entirety.

BACKGROUND OF THE INVENTION

1. Field of the Invention

The invention pertains to a device or an apparatus for the treatment of signals having multiple inputs for the reception or recording of signals, including adjustable elements for the treatment of signals, wherein the adjustable elements are connected with control elements for the adjustment thereof, with the control elements being arranged on a control surface.

2. Discussion of the Background of the Invention and Material Information

A known example for such a device is, for example, a so-called mixer or mixing desk, that is utilized for the treatment of audio signals. In such a mixer, there are always, at the inlet or input for a signal, a plurality of adjustable elements that are switched on or thereunto, with the aid of which the signal can be treated or processed. Possible treatments, for example, are filtering, amplification or the merging or the overblending of several signals. Due to the circumstance that modern mixers are constantly requiring more inlets and that at each inlet there are a plurality of treatment possibilities and thus associated with adjustable elements, there result at such mixers a large number of such adjustable elements and that corresponding to their control surfaces, include up to several thousand control elements. Nevertheless, such devices should provide fitted measurements or dimensions for the operator. Up to now, this circumstance was given consideration in that the individual control elements were fashioned as small as possible.

This development finally leads to obstructed control surfaces that cause faulty manipulations. This happens particularly then when the individual control elements have several functions assigned thereto. In addition, the choosing of functions is also made more difficult due to the complex menu structure. Often times, for those parameters, that are not selected, there is no information that is visible or which can be called up. This leads to substantially slowed actuation and long learning times for the operator.

This invention, as characterized in the appended claims, has the task or objective to produce a device which, with a large number of inlets for the signals and with a large number of control elements for each inlet, still provides an unobstructed control surface, without dispensing with the display of the actual setting of the adjustable elements.

SUMMARY OF THE INVENTION

This objective is achieved in that the control surface includes illustrative displays for the adjustable elements for the treatment of the signals, which displays represent the actual settings of the adjustable elements, and wherein the control surface includes additional control elements and displays or indicators which can each be selectively associated with an illustrated display; in other words that each inlet is associated with substantially only display elements which indicate the actual setting of the adjustable elements. In the most extreme case, the control surface includes only one control element which can be selectively associated with each adjustable element. It is however also possible, to provide a small group of control elements that can be selectively associated with adjustable elements or processors. A connection between the adjustable element and the control element is or can preferably be actuated or established via the display element. In other words, the control surface is subdivided into an inactive part or portion and an active part or portion, wherein the inactive part only informs and influence can be exerted upon the treatment of the signals via the active part. A time dependent connection between the inactive part and the treatment or processing of the signals can be initiated and cancelled via the inactive part.

Specifically, this invention pertains to a device for the treatment of signals having multiple inlets for the reception of signals, including adjustable elements for the treatment of the signals, wherein the adjustable elements are connected with control elements for control purposes, with the control elements being provided on a control surface, wherein the control surface includes image displays for the adjustable elements for the treatment of the signals, with the image displays illustrating the actual setting of the adjustable elements and wherein the control surface includes additional control elements and additional displays, wherein each of the additional control elements and additional displays can be selectively associated with one of the image displays.

In a further embodiment of the device of this invention, connections are provided between each of the adjustable elements and the additional control elements and the additional displays. Preferably, the connections include switching elements, with the switching elements being switchable via the image displays and the image displays take the form of pressure sensitive displays.

In another embodiment of the device of this invention, the image displays include fields. Preferably, the fields have selection elements associated therewith.

In a differing embodiment of the device of this invention, the image displays are designed for the graphical display of the settings of the adjustable elements.

In yet a further embodiment of the device of this invention, each additional display includes a field for the display of values and a field for the setting of values.

In yet another embodiment of the device of this invention, the additional control elements are operatively coupled with the additional displays, so that the settings of the additional control elements are visible in the additional displays.

In yet a differing embodiment of the device of this invention, the control surface forms a part of an audio mixer for audio signals.

The advantages achieved by this invention reside in the fact that the information available to the operator about the actual condition or the present settings of all inlets or channels is always fully available, since the operator can simultaneously access all channels. Localized and quick reaction is thus strongly enhanced and thus becomes more achievable. A short display of a parameter can be seen directly without the necessity of having to select same via other control elements. While a signal is being processed and has its parameters changed in one element, another function for another channel or inlet can also be called up and influenced. The readily viewable or observable layout of the control surface, in accordance with this invention, substantially enhances the understanding or learning of the operation thereof by the user or operator.

BRIEF DESCRIPTION OF THE DRAWINGS

The invention which is set forth with reference to a single operative embodiment thereof will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein:

FIG. 2*a* is an inactive part of a second embodiment of a control surface;

FIG. 2*b* is an active partial part of a second embodiment of a control surface;

FIG. 3*a* is an active part of a control surface;

FIG. 3*b* is shows additional control elements that are connected with the FIG. 3a structure;

FIG. 4*a* is a further embodiment of an inactive portion of a control surface;

FIG. 4*b* is a portion of an active part, similar to that of FIGS. 1*b* and 2*b*.

DETAILED DESCRIPTION OF THE PREFERRED EMBODIMENTS AND BEST MODE

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figures 1A, 1B:
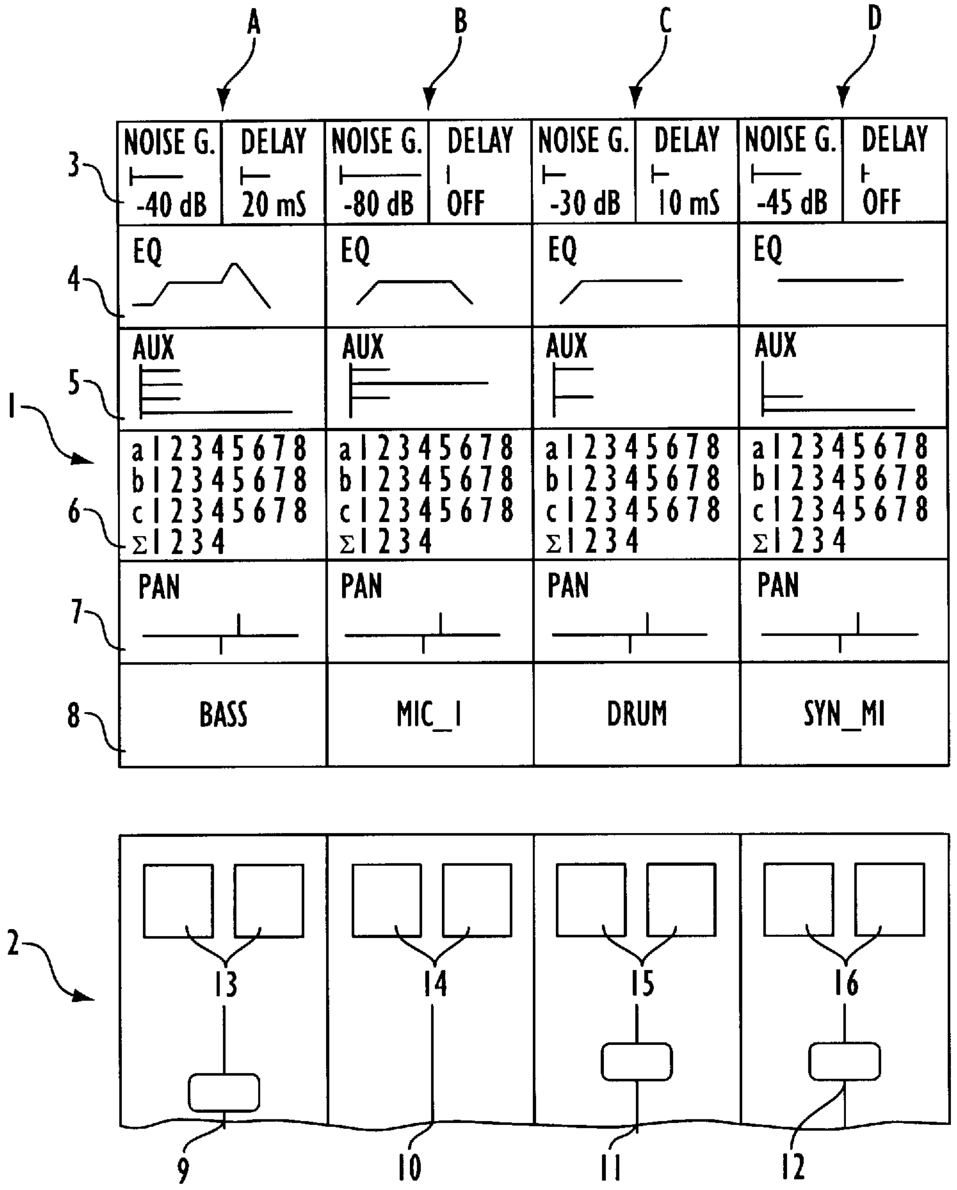
FIG. 1*a* is an inactive part of a first embodiment of a control surface.
FIG. 1*b* is an active partial part of a first embodiment of a control surface.

Figs. 1*a* and 1*b* illustrate a control surface of a device or apparatus for the mixing of electrical signals, for example, of an audio mixer. FIG. 1*a* includes an inactive portion 1 that essentially only provides information, and FIG. 1*b* includes an active part or portion 2, via which influence can be exercised upon the treatment of signals.

Inactive portion 1 here is divided into six lines denominated by numerals 3, 4, 5, 6, 7, 8 and four columns, wherein each column is associated with a so-called channel A, B, C, D for the treatment of a signal, which is entered via an inlet, and wherein each line indicates, a specific type of signal treatment. Line 3, for example, shows the setting of a so-called "Noise Gate", that is the setting of a damping element. Line 3 includes, in this example, for each channel, at least one numerical and one graphic statement or specification for the extent of the damping. Line 4 shows the set frequency characteristic of an equalizer. Line 5 graphically shows additional functions. Line 6 sets forth choices or possibilities for channels which can be brought into cooperation with the signal of the associated channel. A number or a symbol here represents one such channel. Line 7, for example, shows the so-called balance of a stereo channel, that is the relative loudness level of the left channel relative to the right channel. Line 8, for example, only sets forth a statement or specification about the type of the signal which is present at the specific inlet, here, if the signal, for example, emanates from a bass guitar, or which microphone is switched-on, etc.

Active part 2, shown in FIG. 1*b*, is also associated with channels A to D, but is not cooperatively associated with part 1 so as to augment same, rather part 2 is provided hand for a possible addition thereto. Part 2 is comprised of four so-called faders, each including an actuating lever 9, 10, 11 and 12 and keys or signals 13, 14, 15 and 16.

FIG. 2*a* shows a further embodiment of the inactive part 1, in the manner set forth in FIG. 1a, but having twice as many channels. Channels A1, B1, C1, D1 are each connected with one input, which, for example, receives a signal before its recordation on an audio tape, while channels A2, B2, C2, D2 receive the same signal, but as a recording from the audio tape. These channels therefore have other possible setting values than the previously noted channels A1 to D1. It is however also possible to convey a separate signal to each of the eight channels illustrated here. FIG. 2*b* is similar to that of FIG. 1*b*.

In comparison with current audio mixers, via the use of the individual fields of the lines and the columns, instead of one or several rotary knobs of potentiometers or incremental FIG. 3*a* illustrates an active part 17 which cooperates with an inactive part, of the type set forth in Figs. 1*a* and 2*a*, and augments same. Illustrated part 17, for example, shows, in a field 18, a graphic representation of a frequency characteristic 19a as it is produced by an equalizer. Additional fields 19b, 20 and 21, for example, set forth numerical statements or specifications for this frequency characteristic. Fields 22, 23, 24 and 25 are of pressuresensitive construction and can, via human touching, actuate further functions. In this case, via the activation of field 22, the characteristic values of the high frequency portion of the equalizers, can be shown in fields 19b, 20 and 21. An activation of field 25 shows the corresponding values for the low frequency portion thereof. Fields 23 and 24 indicate the values of the middle or intermediate frequency regions, etc.

Additional control elements 26, 27, 28 and 29, shown in FIG. 3*b*, are connected with active portion 17, with these control elements, for example, taking the form of rotary knobs of potentiometers or incremental transformers. Via the use of these control elements, the values that are shown or indicated in fields 19*b*, 20, 21 and possibly 30, can be changed so that another frequency characteristic is produced. The changing of the frequency characteristic is thus immediately perceptible and can thus be optimally arranged.

FIG. 4*a* illustrates inactive part 61 of a display for a channel having fields 62 to 67 with which, for example, selection elements, such as keys 68 to 73 are associated. Via keys 68 to 73, individual fields 62 to 67 can be transmitted to the active portion, thereby also activating same. FIG. 4*b* is a portion of an active part, similar to that of FIGS. 1*b* and 2*b*.

Figure 5:
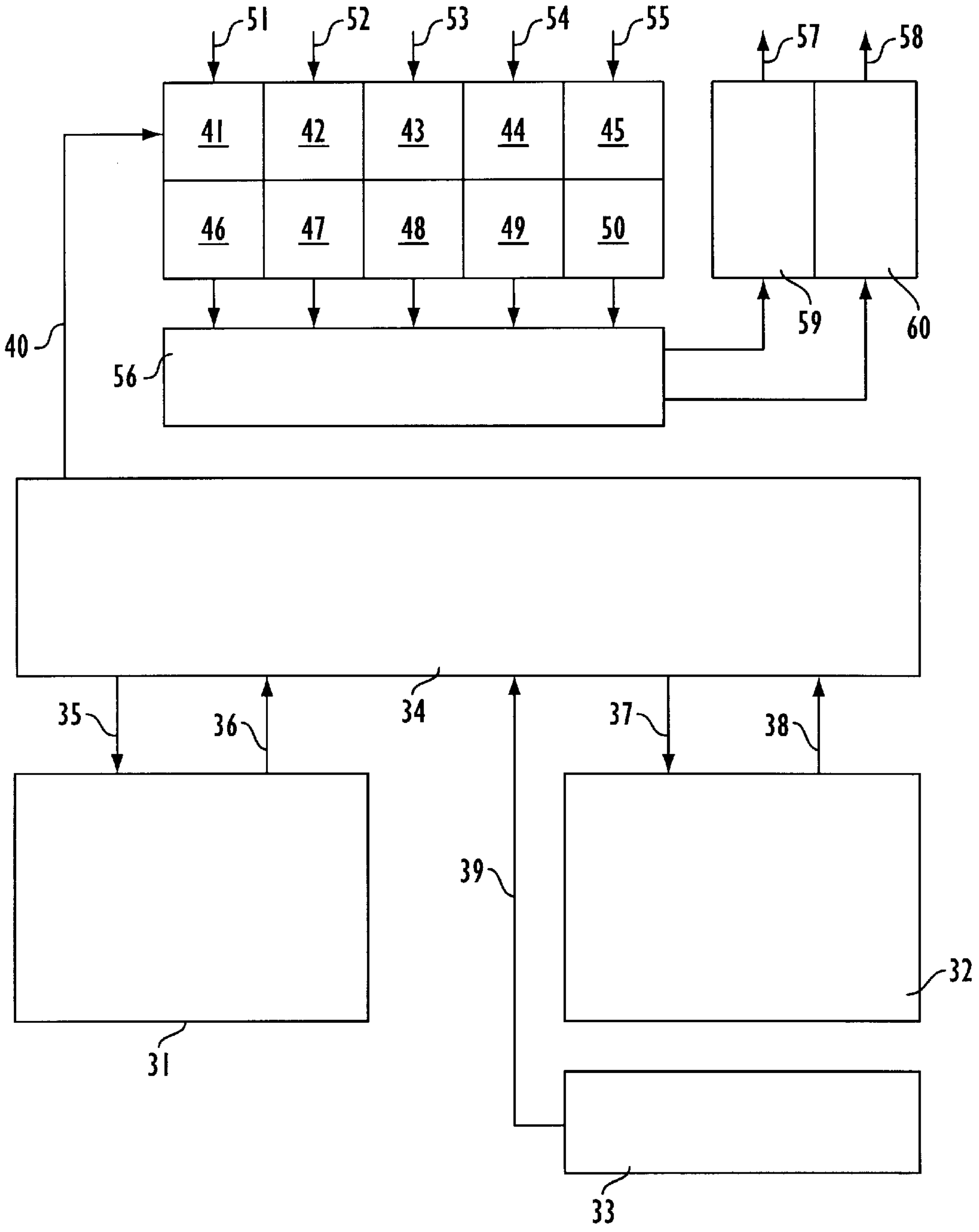
FIG. 5 is a basic schematic showing of a device for the mixing of electrical signals.

FIG. 5 illustrates a block diagram of a device for the treatment of signals. Here the device is specifically a mixer for audio signals. It includes an inactive part 31 of a display of the type shown in FIGS. 2*a* and 4*a*, an active part 32 of a display (FIG. 3*a*), a part 33 having control elements (FIG. 3*b*) and a processor 34. Therein, the three parts 31, 32 and 33 are each connected, via at least bus 35, 36, 37, 38 or 39, with processor 34. The latter, in turn is connected, via bus 40, with adjustable elements 41 to 50, with elements 41 to 50 being able to influence a signal that emanates from inlets 51 to 55. Elements 41 to 50 can, for example, be so constructed that they can carry out one or several functions, for example, those of a converter, an amplifier, a filter or a switch, etc. They are constructed in any desired known manner and are in turn connected with a summing or counting bus 56 of any desired, known construction, wherein bus 56 can mix the signals from inlets 51 to 56, that is of elements 41 to 50, so as to produce a stereo signal for two outlets 57 and 58. Of course, more than two outlets can be utilized for more than two signals. Outlets 57, 58 include, for example, outlet amplifiers, level setters or converters, which here are, together, denominated by numerals 59 and 60.

The operation of this device occurs in the following manner: The inactive part or portion 1 of the display provides a complete overview of the current settings, that is, an operator can immediately recognize, in which way or manner, a signal, located at inlets 51 to 55 is being treated or processed. For example, field 4 shows the frequency characteristics for all channels and the observer can recognize which channel filters out high and which channel filters out low frequencies. From the statements or specifications of the fields of line 6, it can immediately be determined as to with which signal from which other channel, the signal of the channel is being mixed.

In case the indicated information is still insufficient, then via pressure or touch of the respective field, an augmented, enlarged illustration can be called up, with the illustration then appearing in active part 17 (FIG. 3*a*). There, the display is set forth in more detail and, if desired, further input possibilities are offered in part or field 17, in the manner set forth in fields 22 to 25 in FIG. 3*a*. With the just noted selection of a field, control elements 26, 27, 28, 29 are also switched on, so that via turning of same, influence can be exerted upon the treatment of the signal. For each field of part 1 of FIG. 1*a*, that is 24 fields total, a suitable representation, as per the model of FIG. 3*a*, can be called up. For fields 6, respective control elements are shown, for fields 7, a balance regulator appears, that is one of control elements 26 to 29 is switched on and functions as a balance regulator or controller. For fields 5, different levels with exact scaling are indicated and each level can be adjusted via its own control element 26, 27, 28, 29.

If it then desired to change the ways and means via which the signals that arrive through inlets 51 to 55, are to be treated, influence can be exercised, via the control surface, via the effect of elements 41 to 50. For that, the operator overviews, with a glance upon inactive part 31, the actual setting, chooses a field so that same appears in active part 32 larger and more exact and is also possibly augmented via additional display fields or control fields. Thereupon, control elements 33 are also activated and connected with the respective adjustable element. Thus, the desired change can be accomplished via turning of the control elements and via the choice of the available possibilities in active part 32. The processor thereupon controls chosen elements 41 to 50 in a suitable manner so that these elements accomplish the chosen treatment. Once this is accomplished, via the choosing of an additional field in inactive part 31, the active part permits new adjustment possibilities.

Inactive parts 1 and 31, for example, take the form of CRT tubes that are provided with pressure or touch sensitive regions or connected with such regions. Furthermore, active parts 17 and 32 are also so constructed but are possibly also additionally connected with control elements 26 to 29 which assume the respective tasks of the display in the active portion.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. An audio mixing device for adjusting and controlling audio signals received through a plurality of channels comprising:

a plurality of adjustable elements for adjusting the audio signals associated with each of the plurality of channels;

each adjustable element coupled with at least one control element for controlling the audio signal;

the control elements positioned on a control surface, the control surface including a plurality of image display devices associated with each adjustable element;

the plurality of image display devices simultaneously displaying a plurality of images comprising an actual setting of each adjustable element and a plurality of functional responses of the audio signal associated with each actual setting; and at least one additional display that simultaneously displays an enhanced image of a respectively selected at least one of the plurality of images.

2. The device of claim 1, the at least one additional display comprising additional control elements associated with the enhanced image; and further comprising connections between each of the plurality of adjustable elements and the additional control elements and the at least one additional display.

3. The device of claim 2, wherein the connections include switching elements, with the switching elements being switchable via the image displays.

4. The device of claim 1, wherein the image display devices comprise pressure sensitive displays.

5. The device of claim 1, wherein the image display devices include fields.

6. The device of claim 5, wherein the fields have selection elements associated therewith.

7. The device of claim 1, wherein the image display devices graphically display the adjustable elements.

8. The device of claim 1, wherein each additional display includes a field for the display of values and a field for the setting of values.

9. The device of claim 1, the at least one additional display comprising additional control elements associated with the enhanced image: and the additional control elements operatively coupled with the at least one additional display, so that at least one of the actual settings and the functional response of the signal associated with the actual setting of the additional control elements is visible in the at least one additional display device.

10. The device of claim 1, the plurality of functional responses comprising extent of damping, frequency characteristic of an equalizer, selection of other inlets for mixing signals, and stereo balance.

11. An audio mixing device controlling and adjusting audio signals associated with a particular one of a plurality of channels, the device comprising:

a plurality of adjustable elements associated with each of the plurality of channels to adjust the audio signals;

a control surface including a plurality of display devices concurrently displaying each audio signal associated with each of the plurality of channels;

each display device further graphically and concurrently displaying at least an actual setting of each adjustable element and a functional response of the audio signal associated with the actual setting;

an additional display device simultaneously displaying at least one of the actual setting and the functional response for a user selected one of the plurality of channels.

12. The device of claim 11, the functional response comprises extent of damping, frequency characteristic of an equalizer, selection of other inlets for mixing signals, and stereo balance.

13. The device of claim 11, a plurality of control elements associated with each of the plurality of adjustable elements, each of the plurality of control elements coupled to an associated display device and to the additional display device.

* * * * *